Dec. 3, 1968   S. L. JOHNSON   3,414,847
HIGH Q REFERENCE CAVITY RESONATOR EMPLOYING AN INTERNAL
BIMETALLIC DEFLECTIVE TEMPERATURE COMPENSATING MEMBER
Filed June 24, 1966
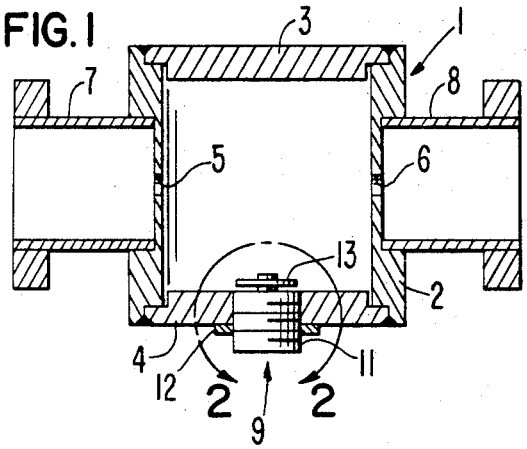
FIG. 1
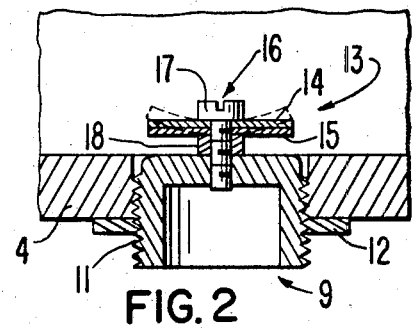
FIG. 2
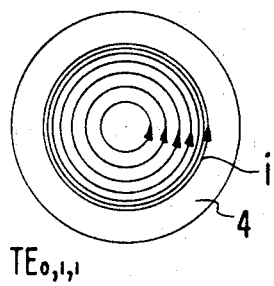
FIG. 3  $TE_{0,1,1}$
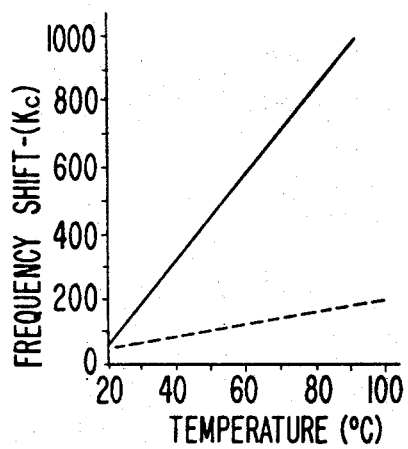
FIG. 4
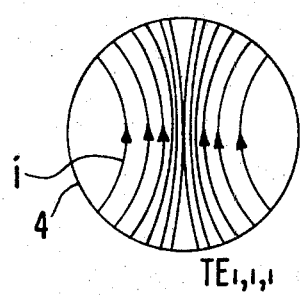
FIG. 6  $TE_{1,1,1}$
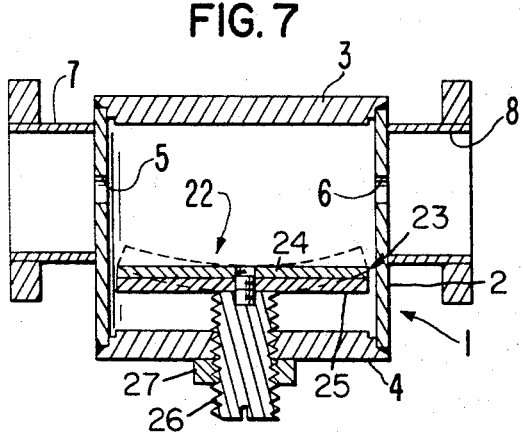
FIG. 7
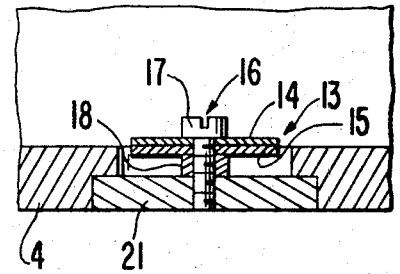
FIG. 5
INVENTOR.
STANLEY L. JOHNSON
BY
ATTORNEY

United States Patent Office 3,414,847
Patented Dec. 3, 1968

3,414,847
HIGH Q REFERENCE CAVITY RESONATOR EMPLOYING AN INTERNAL BIMETALLIC DEFLECTIVE TEMPERATURE COMPENSATING MEMBER
Stanley L. Johnson, Marblehead, Mass., assignor to Varian Associates, Palo Alto, Calif., a corporation of California
Filed June 24, 1966, Ser. No. 560,312
5 Claims. (Cl. 333—83)

ABSTRACT OF THE DISCLOSURE

A temperature compensated microwave reference cavity resonator is disclosed. The reference cavity includes a cavity resonator dimensioned for operation on an excited mode of oscillation having a Q in excess of 5000. A coupling structure is provided for coupling to the fields of the excited mode of the resonator for coupling energy to a utilization device. A tuning structure is provided for tuning the reference frequency of the cavity resonator over a relatively wide band of frequencies. The tuning structure includes an axially movable plug or shaft having a metallic disc fixed to the inner end thereof for displacing inductive fields of the resonator for tuning thereof. The tuning disc is temperature compensated by making the disc of a pair of metallic plates one of the plates having a lower coefficient of thermal expansion than the other and with the lower thermal expansion member being disposed facing the interior of the cavity such that as the cavity increases in temperature the bimetallic tuning plate bows inwardly of the cavity for counteracting the tendency of the resonator to lower its resonant frequency.

Heretofore, rugged microwave reference cavities have been built which have employed the differential thermal expansion between two members such as the end wall of the cavity resonator and its peripheral sealing ring to produce a temperature dependent flexure of the end wall into the cavity to maintain a constant resonant frequency of the cavity over a wide ambient tempearture range. Such a temperature compensating apparatus forms the subject matter of U.S. Patent 3,119,082 issued Jan. 24, 1964. One of the problems encountered with the prior arrangement was that its operation was adversely affected by slight inaccuracies in alignment and sizing of the parts and by stresses introduced into the sealing ring during the manufacturing process. As a result it required extremely precise manufacturing tolerances and repeated heat treatment, after assembly, to remove these stresses, thereby greatly adding to the manufacturing cost.

Other prior temperature compensation arrangements have employed cavity end wall tuner support shafts made of a material having a higher thermal expansion than that of the side and end walls of the cavity such that as the cavity expanded with increased temperature the tuner would advance into the cavity the right distance to maintain a constant resonant frequency. This arrangement requires exact manufacturing tolerances and, in addition, requires large and bulky temperature compensating elements because of the lack of mechanical multiplication in the compensating mechanism. Such a prior arrangement is described in U.S. Patent 2,790,151 issued Apr. 23, 1957.

Still others have employed deflection of bimetallic elements of a tuner assembly to temperature compensate cavity resonators of klyston tubes. Such an arrangement is described and claimed in U.S. Patent 3,209,200, issued Sept. 28, 1965. However, this prior arrangement employed a bimetallic member to deflect a capacitive tuning lever affixed to the bimetallic element. While the scheme produced sufficient mechanical multiplication to permit use of a small bimetallic element, the affixed tuning lever introduced substantial mass onto the bimetallic element and would make the temperature compensator too microphonic in severe vibrational environments. Moreover, cavities used in klystron power amplifier tubes are relatively low Q devices and therefore foreign and unrelated to high Q reference cavity applications to which the present invention is directed.

In the present invention a bimetallic temperature compensation element is introduced into the high Q reference cavity. The compensating element is arranged with the low thermal expansive side facing inwardly of the cavity such that as the temperature of the cavity increases the compensating element bows inwardly of the cavity to displace fields of the cavity and to maintain the resonant frequency thereof constant. In a preferred embodiment the bimetallic element is designed to present a linear deflection with temperature. In another preferred embodiment the bimetallic element is carried from the conventional cavity tuner, whereby the compensation is effective over the entire tuning range of the cavity.

The principal object of the present invention is the provision of an improved temperature compensated high Q reference cavity resonator.

One feature of the present invention is the provision of a bimetallic element disposed internally of a high Q reference cavity resonator such that as the temperature of the cavity increases the bimetallic element will bow inwardly of the cavity to displace fields of the cavity to compensate for the lowering of the resonance frequency with increased temperature.

Another feature of the present invention is the same as the preceding feature wherein the bimetallic element is dimensioned and proportioned to provide a linear deflection with temperature, whereby the linear frequency change with temperature of the cavity is properly compensated.

Another feature of the present invention is the same as any one or more of the preceding wherein the bimetallic compensating element is carried from and moves with the primary tuning member of the cavity resonator, whereby the cavity is properly compensated over its entire tuning range.

Another feature of the present invention is the same as any one or more of the preceding features wherein the bimetallic element is essentially only a thin plate structure which is centrally supported from the cavity structure, whereby said element is effective for compensation while being mechanically rugged to minimize microphonics in a severe vibrational environment.

Other features and advantages of the present invention will become apparent upon a perusal of the following specification taken in connection with the acompanying drawings wherein:

FIG. 1 is a longitudinal sectional view of a cavity resonator incorporating features of the present invention, FIG. 2 is an enlarged fragmentary view of a portion of the structure of FIG. 1 delineated by line 2—2, FIG. 3 is a transverse schematic diagram for the cavity resonator of FIG. 1 showing the current paths for the $TE_{0,1,1}$ mode in the end wall of the cavity, FIG. 4 is a plot of frequency variation versus cavity temperature for a cavity with and without the bimetallic compensator of the present invention, FIG. 5 is a fragmentary longitudinal sectional view of an alternative temperature compensating structure and cavity of the present invention, FIG. 6 is a transverse schematic line diagram of the end wall of the cavity of FIG. 5 depicting the current path configuration in the end wall for the $TE_{1,1,1}$ mode, and FIG. 7 is a longitudinal sectional view of an alternative cavity and temperature compensating embodiment of the present invention.

Referring now to FIG. 1 there is shown a reference cavity resonator 1 incorporating temperature compensating features of the present invention. The cavity resonator 1 comprises a right circular cylindrical tubular member 2 as of Invar which is closed at its ends by a pair of disk-shaped plates 3 and 4 as of Invar soldered to the side wall 2 to define the hollow cylindrical cavity resonator. The interior surfaces of the cavity resonator 1 are plated with a highly conductive material such as gold or silver. The cylindrical interior dimensions for the cavity resonator are selected to provide a resonant frequency for a high Q mode of oscillation such as, for example, the $TE_{0,1,1}$ mode having a $Q_0$ in excess of 5,000 at the desired operating frequency such as 9 gHz.

A pair of coupling iris 5 and 6 communicate through the side wall of the cavity resonator with flanged rectangular waveguide sections 7 and 8 as of Invar. The irises 5 and 6 are located midway along the length of the cylindrical side wall member to strongly couple to the electric fields of the desired $TE_{0,1,1}$ mode of oscillation of the cavity resonator 1. The cavity resonator 1 may be employed as a reference cavity for controlling the frequency of power supplied to a microwave bridge or the like from a reflec klystron in which case only an input waveguide 7 and input coupling iris 5 are required. Alternatively the reference cavity 1 may be employed as a band pass filter or transmission stabilizing cavity in which case both the input waveguide 7 with iris 5 and output waveguide 8 with iris 6 are employed.

A primary cavity tuning structure 9 is positioned on the axis of revolution of the cylindrical cavity at one end thereof. The primary tuning structure 9 is shown in greater detail in FIG. 2 and comprises a threaded tuning plug member 11 as of Invar threaded into the end wall 4 of the cavity 1. The tuning plug 11 projects into and is axially translatable of the cavity for tuning thereof over a band of frequencies as of from 9.20 gHz. to 9.30 gHz. by displacing electromagnetic fields of the cavity resonator 1. A nut 12 is threaded over the outside end of the tuning plug 11 for locking the plug 11 in position at the desired frequency of the cavity resonator 1.

A bimetallic temperature compensating disk-shaped plate element 13 is carried from the inner end of the primary tuning plug 11 for temperature compensating the cavity resonator 1. More particularly, the bimetallic plate 13 is comprised of a sandwich of two metallic plate elements 14 and 15. The plate member 14, which faces inwardly of the cavity resonator 1, is made of a material such as Invar having a lower coefficient of thermal expansion than the outer plate element 15. In this manner, as the temperature of the plate 13 is increased above a certain temperature the plate 13 bows inwardly of the cavity from its central point of support 16, as shown by the dotted lines. The inward bowed deflection of the plate 13 causes the plate 13 to displace more electromagnetic fields of the cavity 1 to counteract the tendency for the volume of the cavity 1 to be increased with increased temperature. This increased temperature would otherwise increase the volume of the electromagnetic fields inside the cavity 1 and lower its resonant frequency as shown by the solid line of FIG. 4.

The support structure which supports the disk-shaped bimetallic element at 16 includes, for example, a number 2–56 fillister head screw 17 threaded into the inner end of the tuning plug 11. A spacing member 18 such as a number 2–56 nut is positioned between the disk 13 and the plug 11 to hold the disk 13 away from the plug 11.

The bimetallac element 13 preferably has a linear deflection with temperature to compensate for the linear frequency shift of the cavity with temperature. A particularly suitable composite disk member 13 having the desired linear deflection characteristic is one wherein the inwardly facing plate member 14 is made of Invar (36% by weight of nickel and 64% by weight of iron), the outwardly facing plate member 15 is made of a material having 72% by weight of manganese, 18% by weight of copper, and 10% by weight of nickel, and the inwardly facing plate 14 comprises 45% by weight of the composite disk member 13.

In a typical example of a temperature compensated cavity 1 of the present invention the cavity was dimensioned for resonance at 9 gHz. for the $TE_{0,1,1}$ mode as depicted in FIG. 3. The bimetallic disk 13 was made of the materials described in the preceding paragraph and was 0.010″ thick and 0.439″ in diameter. The cavity side walls and end walls 2, 3, and 4 were made of Invar having a linear expansion rate of $1.8 \times 10^{-6}$ in./in./° C. and the bimetallic disk 13 had an expansion rate of $20 \times 10^{-6}$ in./in./° C. over a wide temperature range. This arrangement produced the compensated frequency shift characteristic for the cavity as shown by the dotted line of FIG. 4.

Referring now to FIGS. 5 and 6 there is shown an alternative temperature compensation device as employed in a cavity resonator which is substantially the same as that of FIG. 1 except dimensioned and coupled to for excitation of and operation on the $TE_{1,1,1}$ mode of oscillation. This mode has a field configuration producing current path patterns in the end walls 3 and 4 of the cavity 1 as shown in FIG. 6. The temperature compensating bimetallic disk was essentially as shown in FIG. 2 except that the disk-shaped element 13 was supported from the end wall 4 of the cavity 1 instead of from the end of the tuning plug 11. More particularly, the screw 17 was threaded into a disk 21 brazed into the center of the end wall 4. The end wall 4 was brazed to the side wall 2 of the cavity to provide a good electrical connection at the joint therebetween.

Referring now to FIG. 7 there is shown an alternative embodiment of the present invention wherein the cavity resonator is operated in the $TE_{0,1,1}$ mode, as in the structure of FIG. 1, but is tunable over a wider tuning range by means of a primary tuning plunger 22. Also the cavity side and end walls 2, 3 and 4, respectively, were made of cold rolled steel plated with the conductive material as above-described. The tuning plunger 22 included a disk-shaped tuning plate 23 made of a bimetallic sandwich construction for temperature compensation. The inwardly faced metallic plate member 24 of the bimetallic plate was made of Invar and the outwardly faced plate 25 was made of yellow brass (62% by weight copper and 38% zinc). The tuner plate 23 was supported upon the end of an axially directed ⅜″ diameter 1.250″ long cold rolled steel screw 26 threaded through a tapped hole in the end wall 4. A nut 27 was threaded over the outer end of the screw 26 for locking the tuner in place.

In a typical example of the cavity 1 of FIG. 7 the side walls of the cavity were 0.125″ thick cold rolled steel, the end walls 3 and 4 were 0.375″ thick cold rolled steel, the inside diameter of the cavity was 2.077″, the inside length of the cavity was 1.500″, the tuning plunger plate had a diameter of 2.037″ and a thickness of 0.122″. The cavity was tuned to 9 gHz. with a loaded Q of 10,000 and was found to be temperature compensated to approximately 390 kHz. from room temperature of 20° C. to 105° C.

The cavity resonators of FIG. 1 were found to be surprisingly free of microphonics. Vibration tests from 10 to 500 Hz. with 0.060″ displacement of the cavity at 20g's produced only a maximum frequency shift of 150 kHz.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave reference cavity resonator apparatus including; means forming a cavity resonator structure dimensioned for operation on an excited mode of oscillation having a Q in excess of 5000; means forming a coupling structure communicating through a wall of said cavity resonator structure for coupling the fields of the excited mode of said resonator to a utilization device; means forming a bimetallic temperature compensating element disposed inside of said cavity for counteracting frequency shifts in the resonant frequency of said cavity resonator with temperature change and including, a sandwiched bimetallic plate structure, said plate structure being formed of two different metallic plate members, means forming a support structure supporting said bimetallic plate at a point of support from a wall of said cavity resonator structure, one of said plate members having a lower coefficient of thermal expansion than said other plate member, said lower coefficient of thermal expansion member being disposed facing the interior of said cavity, whereby as said cavity resonator increases in temperature said compensating bimetallic plate structure bows inwardly of said cavity from its point of support to produce a tuning effect which is essentially entirely due to field displacement by said bimetallic plate to counteract the tendency of said cavity resonator to lower its resonant frequency with increased temperature, means forming a primary cavity tuning structure movable within said cavity resonator for tuning the resonator frequency thereof over a band of frequencies, said primary cavity tuning means including a disc shaped tuning plate member axially translatable of said cavity resonator, and wherein said disc shaped tuning member forms said bimetallic temperature compensating plate structure whereby said thermal compensating means compensates said cavity resonator over its tuning band.

2. The apparatus of claim 1 wherein said primary cavity tuning means comprises a conductive plug projecting into said cavity resonator for tuning thereof, and wherein said bimetallic temperature compensating bimetallic plate structure is carried from the internal end of said primary tuning plug.

3. The apparatus of claim 2 wherein said bimetallic plate structure is disk-shaped and centrally supported from said tuning plug means, and wherein said bimetallic disk is proportioned and dimensioned to have essentially a linear displacement with temperature.

4. The apparatus of claim 3 wherein said cavity resonator is a right circular cylinder dimensioned and excited for operation on a $TE_{1,m,n}$ mode, and wherein said primary tuning plug is disposed on the axis of revolution of said cylindrical cavity resonator projecting into said cavity from an end wall thereof in a direction along the axis of revolution of said cavity resonator.

5. The apparatus of claim 4 wherein said inwardly facing element of said bimetallic plate structure is made of Invar, and said right circular cavity resonator structure is made of Invar.

References Cited
UNITED STATES PATENTS 3,252,116   5/1966   Painter _____ 333—83

FOREIGN PATENTS 882,408   11/1961   Great Britain.

HERMAN KARL SAALBACH, *Primary Examiner.*

L. ALLAHUT, *Assistant Examiner.*